United States Patent
Burkholder et al.

(10) Patent No.: US 7,469,777 B2
(45) Date of Patent: Dec. 30, 2008

(54) WEAR INDICATING FRICTION DISC

(75) Inventors: Phillip S. Burkholder, Pittsboro, IN (US); Andrew D. Copeland, Greenwood, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 178 days.

(21) Appl. No.: 11/260,487

(22) Filed: Oct. 28, 2005

(65) Prior Publication Data

US 2007/0095626 A1 May 3, 2007

(51) Int. Cl.
*F16D 66/02* (2006.01)

(52) U.S. Cl. .............................. 192/30 W; 188/1.11 W

(58) Field of Classification Search ............ 188/1.11 W
See application file for complete search history.

(56) References Cited

U.S. PATENT DOCUMENTS

| | | | | |
|---|---|---|---|---|
| 4,049,084 | A | | 9/1977 | Beemer |
| 4,085,826 | A | * | 4/1978 | Ritsema et al. ........ 188/1.11 W |
| 4,266,633 | A | * | 5/1981 | Barabino et al. ....... 188/1.11 W |
| 4,604,604 | A | | 8/1986 | Mann |
| 4,606,435 | A | * | 8/1986 | Johnson .................. 188/1.11 L |
| 5,020,650 | A | | 6/1991 | Heidenreich |
| 5,099,960 | A | * | 3/1992 | Alev ......................... 188/73.1 |
| 5,181,593 | A | | 1/1993 | Flotow |
| 5,238,093 | A | | 8/1993 | Campbell |
| 5,295,909 | A | | 3/1994 | Heidenreich |
| 5,299,667 | A | * | 4/1994 | Hammond ............ 188/218 XL |
| 5,520,265 | A | * | 5/1996 | Kobayashi et al. ..... 188/1.11 W |
| 5,712,805 | A | | 1/1998 | Wang |
| 5,779,006 | A | * | 7/1998 | Hyde et al. ............. 188/250 D |
| 5,908,097 | A | | 6/1999 | Grosspietsch |
| 6,040,768 | A | | 3/2000 | Drexl |
| 6,206,158 | B1 | | 3/2001 | Müller |
| 6,276,197 | B1 | | 8/2001 | Hayashi |
| 6,296,099 | B1 | | 10/2001 | Gochenour |
| 6,357,570 | B1 | | 3/2002 | Despres |
| 6,659,233 | B2 | | 12/2003 | DeVlieg |
| 2003/0062237 | A1 | | 4/2003 | Ziegler |

FOREIGN PATENT DOCUMENTS

JP        56090134 A    *  7/1981

* cited by examiner

Primary Examiner—Richard M. Lorence
(74) Attorney, Agent, or Firm—Timothy J. Klima

(57) ABSTRACT

A wear indicating friction disc assembly includes at least two friction discs and may include a plurality of clamping assemblies positioned around a circumference of the friction discs to clamp at least two of the friction discs together. At least one of the clamping assemblies may include a wear indicating washer with a wear indicating portion extending into a portion of one at least one of the friction discs. A height of the wear indicating portion is set to engage the opposing friction member at a predetermined wear level of the friction disc assembly and to emit a detectable signal upon sliding engagement with the opposing friction member.

31 Claims, 3 Drawing Sheets

WEAR INDICATING FRICTION DISC

BACKGROUND OF THE INVENTION

The present invention relates to a wear indicating friction disc, and more particularly, to a wear indicator for a multiple friction disc aircraft clutch.

Wear indicators, including audible signaling elements, are known for indicating/signaling brake/clutch disc wear. See for instance, Beemer (U.S. Pat. No. 4,049,084), which discloses the use of a secondary frictional material between a primary frictional material and a backing plate for a clutch or brake system. Upon sufficient wear of the primary material, the reaction member comes into contact with the secondary material and produces an audible sound indicating that replacement of the friction member is due. FIGS. 9, 10 and 11 show specific embodiments where the secondary friction material 94/52 is carried in apertures in the primary material.

Mann (U.S. Pat. No. 4,604,604) discloses the use of a vapor emitting wear indicator for use with a brake lining or clutch pad. FIG. 3 shows an embodiment where a capsule 18 including a vapor emitting material is positioned in a sleeve 24 of the lining 14 and will emit a distinct scent and/or colored smoke upon being the lining/pad wearing to the point that the capsule comes into contact with the reactive member.

Campbell (U.S. Pat. No. 5,238,093), Heidenreich (U.S. Pat. No. 5,295,909 and U.S. Pat. No. 5,020,650), Grosspietsch (U.S. Pat. No. 5,908,097), DeVlieg (U.S. Pat. No. 6,659,233), Flotow (U.S. Pat. No. 5,181,593), Müller (U.S. Pat. No. 6,206,158), Gochenour (U.S. Pat. No. 6,296,099), Despres (U.S. Pat. No. 6,357,570), and Ziegler (USPA 2003/0062237) all disclose brake/clutch wear indicators that provide a visual indication of wear of the brake/clutch lining.

Drexl (U.S. Pat. No. 6,040,768) discloses a system for monitoring clutch wear status that uses speed and position information. Hayashi (U.S. Pat. No. 6,276,197) discloses a system that uses an electromechanical sensor 19 for measuring clutch wear. Wang (U.S. Pat. No. 5,712,805) discloses a noise diagnostic system for a vehicle.

Certain Mercedes automobiles use electrical brake wear indicators that insert into the side of the disc brake pads. When the brake pads wear to the point of uncovering the indicator, an electrical path is made through the indicator to signal that the pad needs replacement.

Carbon/carbon composite friction discs are used in a variety of aircraft for brake disc material. As the discs are used, they wear away. Each disc has a designated amount of wear material that can be used. However, an aircraft clutch using the same material often experiences unequal wear between the plates (discs). Therefore, while one plate may still be within acceptable wear limits, another plate may be beyond acceptable wear limits and should be replaced to prevent failure of the clutch plate and clutch and/or to maintain the torque handling capability of the clutch within acceptable limits.

In such an aircraft clutch, there is a need to determine whether one or more clutch plates of the clutch have reached their acceptable wear limits and to signal that this has occurred. Detection of the unequal wear assures proper condition based maintenance while the clutch is still functioning normally.

SUMMARY OF THE INVENTION

In certain aircraft clutch discs, the disc is assembled from two stacked carbon discs to provide a desired thickness for the disc assembly. Such split discs utilize rivets and washers to clamp the two carbon discs together. In the present invention, one or more of the clamping washers is modified to have a wear indicating portion that extends into the disc beneath a disc surface that engages the friction surface of a mating disc assembly in a sliding manner. When the disc surface wears to the depth of the wear indicating portion, it creates a wear signal in the form of a unique noise or vibration that can be detected audibly and/or by an aircraft Preventative Health Maintenance (PHM) system, which then reports the need for maintenance. The depth of the wear indicating portion below the friction surface is determined to emit the wear signal while the disc assembly is still within acceptable wear limits and to provide sufficient warning so that preventative maintenance can be performed in due course before the disc assembly wears beyond acceptable limits.

By using such a modified clamping washer in place of a conventional clamping washer, no additional components are necessary to install the wear indicator on conventional clutch discs. This provides for a simple, reliable, light-weight and cost effective wear indicator.

The material selected for the wear indicating portion/washer is preferably one that will not damage the carbon/carbon friction discs when they come into contact with the wear indicating portion/washer but will produce the noise/vibration as they wear away that will be detected by the PHM system. The present invention can be used with other types of friction discs and friction discs made of alternative materials.

The invention is preferably applied to each clutch disc in a multi-disc aircraft clutch to signal when any one of the discs is approaching its wear limit. The number and circumferential spacing of the wear indicators can be varied from disc to disc to provide unique vibratory wear signals for each particular disc. This can then be used to specifically pinpoint the worn disc.

DETAILED DESCRIPTION OF THE INVENTION

Figure 1:
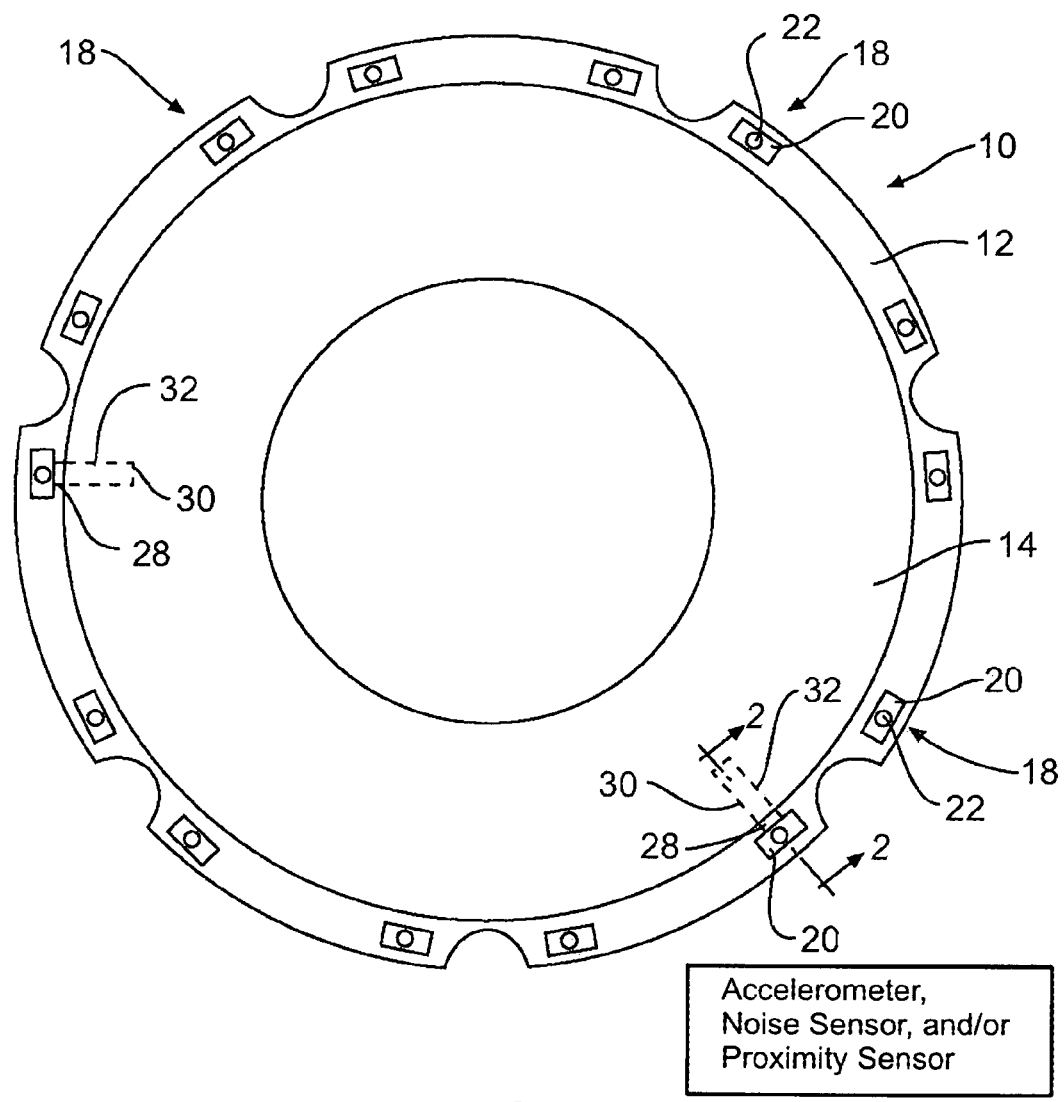
FIG. 1 is an axial side view of one embodiment of a clutch disc assembly of the present invention.

FIG. 1 shows an axial side view of one embodiment of a clutch disc assembly 10 of the present invention. The clutch disc assembly 10 is constructed of two carbon fiber discs 14 and 16 (see FIG. 2) that are clamped together by a plurality of clamp assemblies 18. In a preferred embodiment, each disc 14 and 16 has an axial relief 12 at its outer circumferential edge to accommodate the clamping assemblies 18 without interfering with the clamping assemblies of adjacent disc assemblies 10 during operation. Although the number of clamp assemblies 18 shown in FIG. 1 is 14, this number can be changed to provide the desired clamping strength to the disc assembly 10, as can the positioning of the clamp assemblies 18 around the circumference of the clutch disc assembly

10. Other configurations of disc assemblies 10 can also use the present invention, as can disc assemblies constructed of other materials.

Figure 3:
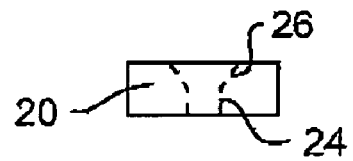
FIG. 3 (Prior Art) is a side elevational view of a known clutch disc assembly clamping washer.

Each clamp assembly 18 preferably includes two clamping washers 20 connected together by a rivet 22 which passes through bores 24 in the clamping washers 20 to create a clamping force on the two friction discs 14 and 16. FIG. 3 shows a side elevational view of a known clamping washer 20 for clamping together a clutch disc assembly 10. Other fasteners, such as threaded fasteners, can be used in place of the rivet 22, although the rivet 22 is preferred because of its simplicity, strength, low cost, and reliability. Preferably, the bore 24 of the clamping washer 20 has a countersunk portion 26 to accommodate the head of the rivet 22, which reduces the height of the rivet 22. Preferably, the rivet 22 will be made flush with an outer surface of the clamping washer 20 as shown to reduce possible interference between rivets 22 of adjacent disc assemblies 10. Although the use of two opposing clamping washers 20 is presently preferred to help distribute the clamping forces, in an alternative embodiment, the head of a headed fastener can be substituted for one of the clamping washers 20.

Certain of the clamping washers 20 are provided with sideways extending wear indicating portions 30 to become wear indicating washers 28. Here, the wear indicating portions extend radially inward but they can be configured for a particular application as desired. The wear indicating portions 30 are configured with the wear indicating washers 28, so that the wear indicating portions 30 will be uncovered when the disc assembly 10 is near a wear limit, thereupon emitting a wear signal caused by the running contact between the adjacent disc assembly and the uncovered wear indicating portions 30. This wear signal will be in the form of a vibration detectable by the PHM system. The wear signal can be sensed by electronic sensors such as accelerometers, noise sensors, and the like.

Furthermore, the frequency range of the indicating portion 30 can be tuned to generate sound waves in the audible range for human ears. It is also contemplated that the wear signal can be generated by a proximity sensor or probe that can sense the distance of the wear indicating portion 30 from the wear surface of the friction disk 14. This wear signal will cause a variation in the vibration that normally results from frictional sliding contact between adjacent disc assemblies when the clutch is engaged and allowed to slip. Of course, when the clutch is locked up, there will be no vibration signals resulting from disc to disc sliding unless the torque capacity of the clutch is surpassed. It is preferred that the wear indicating portions 30 be configured to be uncovered and begin emitting wear signals before the absolute wear limit of the assembly disc is reached. In this manner, a comfortable cushion of time can be provided to allow non-disruptive scheduling of the appropriate maintenance after the wear signals are first emitted.

Figure 2:
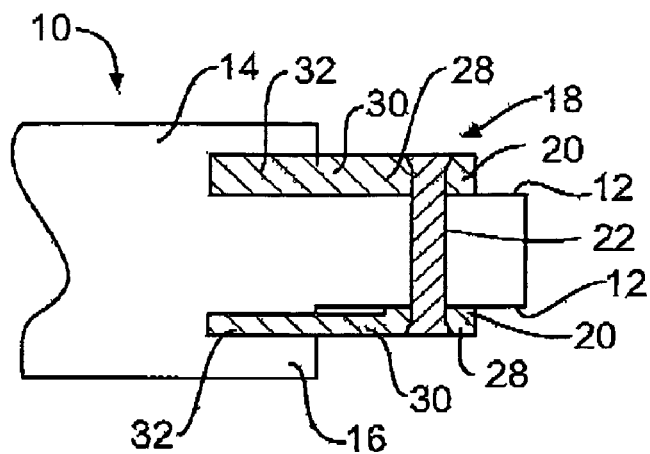
FIG. 2 is a partial sectional view of the clutch disc assembly of FIG. 1, taken along section line 2-2 of FIG. 1.
Figure 4:
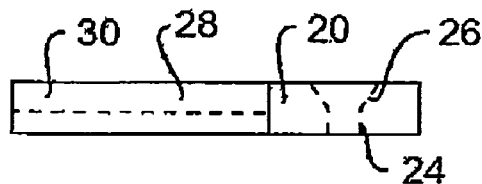
FIG. 4 is a side elevational view of one embodiment of the wear indicating washer of the present invention.
Figure 5:
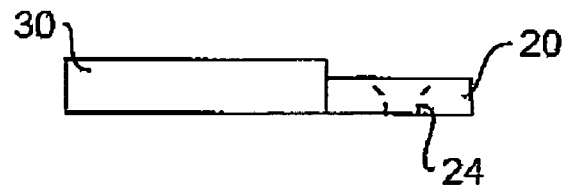
FIG. 5 is a side elevational view of a further embodiment of the wear indicating washer of the present invention.
Figure 6:
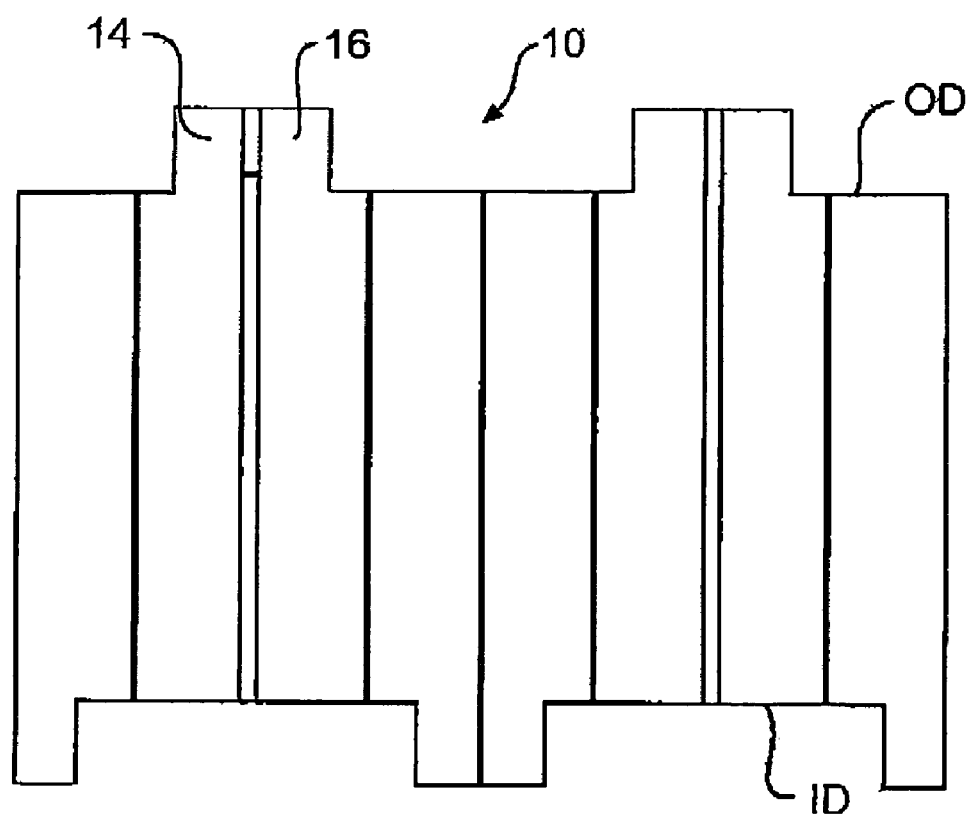
FIG. 6 is a schematic view of a multiple friction disc clutch assembly.

In one embodiment shown in FIG. 4 and the upper portion of FIG. 2, the wear indicating portion 30 is the same height as the clamping washer 20. In an embodiment shown in the lower half of FIG. 2, the wear indicating portion 30 is of a shorter height than the clamping washer 20. This embodiment is of lighter weight than the above embodiment. In the embodiment shown in FIG. 5, the wear indicating portion 30 is taller than the clamping washer 20. In this embodiment, the wear indicating portion 30 will be uncovered upon disc wear and begin signaling disc wear before the adjacent disc assembly 10 makes contact with the clamping washer 20. In an alternative embodiment, each disc assembly can be provided with two or more sets of wear indicating washers 28, with each set being uncovered at a different wear level of the disc assembly. In this manner, the progressive resulting wear signals can provide indication of progressive wear of the disc assembly.

For instance, one set of wear indicating washers can be set at a level to be uncovered and begin emitting wear signals at 10% of the remaining allowable wear of the disc assembly 10, while a second set of wear indicating washers can be set at a level to be uncovered and begin emitting wear signals at 5% or even 0% of the remaining allowable wear of the disc assembly 10. The same progressive wear signaling can also be accomplished through the use of layered wear indicating washers 28, where each layer is constructed of a different material to provide a different wear signal when uncovered. See FIG. 4, wherein possible upper and lower layers of the wear indicating portion 30 are indicated by the phantom line.

The wear indicating portion 30 can have the same width as the clamping washer 20 or a different width. As shown in FIG. 1, the wear indicating portions 30 can be narrower than the clamping washers 20. Although the wear indicating portions 30 and clamping washers 20 are shown as having generally flat, rectangular configurations, other configurations can also be used. Preferably, the wear indicating portion 30 and washer 20 are integral to one another on wear indicating washers 28. In one embodiment, the wear indicating washers 28 are constructed of Monel®, although other materials can also be used.

Such wear indicating portions 30 are accommodated in channels 32 formed in the discs 14 and 16. The channels 32 are shown as being open only radially at the relief 12 of the outer circumference of the discs, but in an alternative embodiment, the channels 32 can be open axially outward as well. The channels 32 can be machined into the discs using known machining methods, can be cast into the discs during the manufacture of the discs or formed with other manufacturing methods as is known to those skilled in the art. The channels 32 are preferably configured to have the same shape as the wear indicating portions 30 so as to securely support the wear indicating portions 30 when they are uncovered and begin to be contacted by the adjacent moving disc assembly. In one embodiment, adhesive can be used during assembly of the disc assemblies to secure the wear indicating portions 30 in the channels 32, although this may not be necessary if the washers 20 are securely clamped and the wear indicating portions 30 are securely supported in the channels 32 by the surrounding disc material. In an alternative embodiment, the wear indicating washers can be cast into the discs during disc manufacture.

In the embodiment shown in FIG. 1, two wear indicating washers 28 are used on the shown side of the disc assembly 10, positioned at an angle of about 133° to one another. As discussed above, this number and positioning of wear indicating washers 28 can be varied as desired. In a further aspect of the invention, each clutch disc assembly 10 of a multi-disc clutch can be provided with a different number and/or positioning of the wear indicating washers 28 so that each disc assembly 10 will produce a unique wear signal that can be differentiated by the PHM system to help identify the problem disc assembly 10 in a multi-disc clutch.

That is, if one disc assembly 10 has two wear indicating washers positioned approximately 50° apart, it will produce a different wear signal (vibration or tone) than a disc assembly 10 that has two wear indicating washers positioned about 180° apart. Under one maintenance approach, the wear of one disc assembly 10 to the wear limits can be used as an indicator to replace all of the disc assemblies in the clutch, though this may not be required under an alternative maintenance approach. In one embodiment, the positioning of the wear indicating washers 28 on one side of a disc assembly will be generally circumferentially opposite the positioning of wear indicating washers on the other side of the disc assembly 10 to assist in maintaining the rotational balance of the disc assembly 10.

In an alternative embodiment, the wear indicating washers 28 need not clamp two friction discs together, but can clamp one friction disc to another clutch assembly component, such as an inner or outer disk hub, a disk carrier or other component. Alternatively, the wear indicating washers can be clamped only to a single disk.

Although the present invention has been discussed above in reference to use in a multi-disc clutch of an aircraft, it can be used with other friction discs in other applications. Various aspects of the embodiments described above can also be combined in different manners to create new embodiments.

What is claimed is:

1. A wear indicating friction disc assembly, comprising:
   a friction disc;
   a first wear indicating element that is positioned within a portion of the friction disc that is engageable with an opposing friction member to transmit torque between the friction disc assembly and the opposing friction member, a height of the wear indicating element being set so as to engage the opposing friction member at a predetermined wear level of the friction disc assembly and thereby emit a first detectable vibratory signal upon sliding engagement with the opposing friction member; and
   a second wear indicating element that is positioned within a portion of the friction disc that is engageable with the opposing friction member, a height of the wear indicating element being set so as to engage the opposing friction member at a second further predetermined wear level of the friction disc assembly and thereby emit a second detectable vibratory signal upon sliding engagement with the opposing friction member.

2. A wear indicating friction disc assembly as in claim 1, and further comprising:
   two friction discs;
   a plurality of clamping assemblies positioned around a circumference of the friction discs to clamp the two friction discs together, each clamping assembly comprising at least one clamping washer engaging a first side of the clamped friction discs and a fastener passing though the clamping washer and the two friction discs to create a clamping force between the at least one clamping washer and the two friction discs;
   wherein, at least one of the clamping washers is one of the wear indicating elements and includes a wear indicating portion extending from a clamping portion of the washer into the portion of the friction disc that is engageable with the opposing friction member to emit the detectable vibratory signal upon sliding engagement with the opposing friction member.

3. A wear indicating friction disc assembly as in claim 2, wherein the wear indicating portion is received in a channel of the friction disc, the channel having a corresponding shape to the wear indicating portion to provide support to the wear indicating portion.

4. A wear indicating friction disc assembly as in claim 2, wherein the wear indicating portion of the wear indicating washer is taller than the washer clamping portion and will engage the opposing friction member before the clamping portion upon wear of the friction disc assembly.

5. A wear indicating friction disc assembly as in claim 4, comprising at least one additional wear indicating washer positioned on a same side of the friction disc assembly as the at least one wear indicating washer, the at least one additional wear indicating washer spaced apart from the at least one wear indicating washer around a circumference of the friction disc assembly.

6. A wear indicating friction disc assembly as in claim 5, wherein each of the clamping assemblies includes two clamping washers positioned on opposing sides of the two friction discs and being clamped together by the fastener.

7. A wear indicating friction disc assembly as in claim 6, wherein the fastener is a rivet and each of the clamping washers includes a countersunk portion to accommodate opposing heads of the rivet.

8. A wear indicating friction disc assembly as in claim 2, comprising:
   at least one opposing side wear indicating washer that includes a wear indicating portion extending from a clamping portion of the washer into a portion of the other of the friction discs that is engageable with a further opposing friction member to transmit torque between the friction disc assembly and the further opposing friction member, a height of the wear indicating portion being set so as to engage the further opposing friction member at a predetermined wear level of the friction disc assembly and to emit a detectable vibratory signal upon sliding engagement with the further opposing friction member.

9. A wear indicating friction disc assembly as in claim 8, wherein the wear indicating washer and the opposing side wear indicating washer are positioned generally circumferentially opposite one another to assist in maintaining a balance of the friction disc assembly.

10. A wear indicating friction disc assembly as in claim 9, comprising a plurality of spaced apart wear indicating washers and a like plurality of opposing side wear indicating washers also spaced apart in a like manner to the plurality of wear indicating washers.

11. A wear indicating friction disc assembly as in claim 2, wherein the wear indicating portion of the wear indicating washer is the same height as the washer clamping portion.

12. A wear indicating friction disc assembly as in claim 2, wherein the wear indicating portion of the wear indicating washer is shorter than the washer clamping portion.

13. A wear indicating friction disc assembly as in claim 2, wherein the second wear indicating element is a further wear indicating washer that includes a wear indicating portion extending from a clamping portion of the washer into a portion of one of the friction discs that is engageable with the opposing friction member to transmit torque between the friction disc assembly and the opposing friction member, a height of the wear indicating portion being set so as to engage the opposing friction member at a second predetermined wear level of the friction disc assembly beyond the predetermined wear level and to emit a further detectable vibratory signal upon sliding engagement with the opposing friction member.

14. A wear indicating friction disc assembly as in claim 1, wherein the first wear indicating element and the second wear indicating element are of different materials to provide the first and second detectable vibratory signals.

15. A clutch, comprising:
   a plurality of friction disc assemblies in axial alignment and engageable with one another to transmit torque;
   each friction disc assembly comprising:

a friction disc;
   at least one wear indicating element that is positioned within a portion of the friction disc that is engageable with a opposing friction disc assembly to transmit torque between the friction disc assembly and the opposing friction disc assembly, a height of the wear indicating portion being set so as to engage the opposing friction disc assembly at a predetermined wear level of the friction disc assembly and to emit a detectable vibratory signal upon sliding engagement with the opposing friction disc assembly;
  wherein the at least one wear indicating element for each friction disc assembly is constructed and arranged to emit a predetermined unique detectable vibratory signal upon sliding engagement with the opposing friction disc assembly so that the specific friction disc assembly in the clutch exhibiting wear can be identified.

16. A clutch as in claim 15, each friction disc assembly further comprises:
  two friction discs;
  a plurality of clamping assemblies positioned around a circumference of the friction discs to clamp the two friction discs together, each clamping assembly comprising at least one clamping washer engaging a first side of the clamped friction discs and a fastener passing though the clamping washer and the two friction discs to create a clamping force between the at least one clamping washer and the two friction discs;
  wherein, at least one of the clamping washers is the wear indicating element and includes the wear indicating portion being set so as to engage the opposing friction disc assembly to emit the detectable vibratory signal.

17. A clutch as in claim 16, wherein the wear indicating portion is received in a channel of the friction disc, the channel having a corresponding shape to the wear indicating portion to provide support to the wear indicating portion.

18. A clutch as in claim 16, wherein the wear indicating portion of the wear indicating washer is taller than the washer clamping portion and will engage the opposing friction disc assembly before the clamping portion upon wear of the friction disc assembly.

19. A clutch as in claim 18, comprising at least one additional wear indicating washer positioned on a same side of the friction disc assembly as the at least one wear indicating washer, the at least one additional wear indicating washer spaced apart from the at least one wear indicating washer around a circumference of the friction disc assembly.

20. A clutch as in claim 19, wherein each of the clamping assemblies includes two clamping washers positioned on opposing sides of the two friction discs and being clamped together by the fastener.

21. A clutch as in claim 20, wherein the fastener is a rivet and each of the clamping washers includes a countersunk portion to accommodate opposing heads of the rivet.

22. A clutch as in claim 16, comprising:
  at least one opposing side wear indicating washer that includes a wear indicating portion extending from a clamping portion of the washer into a portion of the other of the friction discs that is engageable with a further opposing friction disc assembly to transmit torque between the friction disc assembly and the further opposing friction disc assembly, a height of the wear indicating portion being set so as to engage the further opposing friction member at a predetermined wear level of the friction disc assembly and to emit a detectable vibratory signal upon sliding engagement with the further opposing friction disc assembly.

23. A clutch as in claim 22, wherein the wear indicating washer and the opposing side wear indicating washer are positioned generally circumferentially opposite one another to assist in maintaining a balance of the friction disc assembly.

24. A clutch as in claim 23, comprising a plurality of spaced apart wear indicating washers and a like plurality of opposing side wear indicating washers also spaced apart in a like manner to the plurality of wear indicating washers.

25. A clutch as in claim 16, comprising:
  a further wear indicating washer that includes a wear indicating portion extending from a clamping portion of the washer into a portion of one of the friction discs that is engageable with the opposing friction disc assembly to transmit torque between the friction disc assembly and the opposing friction disc assembly, a height of the wear indicating portion of the further wear indicating washer being set so as to engage the opposing friction member at a second predetermined wear level of the friction disc assembly beyond the predetermined wear level and to emit a further detectable vibratory signal upon sliding engagement with the opposing friction member.

26. A clutch as in claim 16, wherein the wear indicating portion of the wear indicating washer includes at least a first layer and a second layer of different materials, the first layer emitting a first wear signal upon sliding engagement with the opposing friction disk assembly at the predetermined wear level, the second layer emitting a second wear signal upon sliding engagement with the opposing friction disk assembly at a second predetermined wear level.

27. A clutch as in claim 16, wherein each friction disk assembly includes at least one of a unique number of wear indicating washers and a unique positioning of wear indicating washers so that each friction disk emits the unique detectable vibratory signal.

28. A clutch as in claim 15, wherein each friction disk assembly includes at least one of a unique number of wear indicating elements and a unique positioning of wear indicating elements so that each friction disk emits the unique detectable vibratory signal.

29. The clutch of claim 15, wherein the detectable vibratory signal is operable for being received by at least one of an accelerometer and a noise sensor.

30. The clutch of claim 15, wherein the detectable vibratory signal transmitted in an audible frequency range.

31. The clutch of claim 15, wherein a position of the wear indicating element relative to a wear surface of the disk is determined by a proximity sensor.

* * * * *